(12) United States Patent
Fergusson

(10) Patent No.: US 7,167,093 B2
(45) Date of Patent: Jan. 23, 2007

(54) METHOD OF STEERING CAPACITOR FIELDS FOR USE IN CAPACITIVE SENSING SECURITY SYSTEMS

(75) Inventor: Robert T. Fergusson, Palm Harbor, FL (US)

(73) Assignee: Invisa, Inc., Sarasota, FL (US)

( * ) Notice: Subject to any disclaimer, the term of this patent is extended or adjusted under 35 U.S.C. 154(b) by 0 days.

(21) Appl. No.: 10/538,533

(22) PCT Filed: Dec. 10, 2003

(86) PCT No.: PCT/US03/39235

§ 371 (c)(1),
(2), (4) Date: Jul. 29, 2005

(87) PCT Pub. No.: WO2004/053524

PCT Pub. Date: Jun. 24, 2004

(65) Prior Publication Data

US 2006/0152361 A1    Jul. 13, 2006

Related U.S. Application Data

(60) Provisional application No. 60/432,150, filed on Dec. 10, 2002.

(51) Int. Cl.
G08B 21/00    (2006.01)

(52) U.S. Cl. ............. 340/562; 340/540; 340/541; 340/545; 340/686.6; 324/76.52; 324/76.53; 324/652; 324/683

(58) Field of Classification Search ........... 340/562, 340/540, 541, 545, 686.6; 324/76.52, 76.5, 324/652, 683
See application file for complete search history.

(56) References Cited

U.S. PATENT DOCUMENTS

| 5,442,347 | A | * | 8/1995 | Vranish | 340/870.37 |
| 5,952,835 | A | * | 9/1999 | Coveley | 324/671 |
| 6,731,209 | B2 | * | 5/2004 | Wadlow et al. | 340/562 |

* cited by examiner

Primary Examiner—Tai Nguyen
(74) Attorney, Agent, or Firm—Gifford, Krass, Groh, Sprinkle, Anderson & Citkowski, P.C.

(57) ABSTRACT

The present invention provides a capacitive sensing apparatus having utility in object detection security applications whereby the object detection field generated by the apparatus is made steerable. The apparatus includes a power source having a ground connection in communication with at least one sensing circuit operative to detect an object moving within the sensing field. At least one conductive element is provided in communication with electrical ground. To steer the direction of the sensing field, the relative position and distance between the conductive element and the sensing circuit is adjusted such that a desired sensing field pattern is obtained.

17 Claims, 7 Drawing Sheets

METHOD OF STEERING CAPACITOR FIELDS FOR USE IN CAPACITIVE SENSING SECURITY SYSTEMS

RELATED APPLICATION

This application is a 371 of PCT/US03/39235 filed on Dec. 10, 2003, which claims priority of U.S. Provisional Patent Application Ser. No. 60/432,150 filed Dec. 10, 2002, which is incorporated herein by reference.

FIELD OF THE INVENTION

The present invention relates to a method of steering electric fields of capacitive sensing systems.

BACKGROUND OF THE INVENTION

There are times when the electric field generated by a sensing element used in a capacitive sensing system requires directionality or pattern shaping to enhance the overall utility of the sensing system.

It is appreciated that a portion of an electric field radiated from a sensing element will be readily absorbed into a grounded conductive object standing within proximity of its radiated field. An example of such an interaction between a radiated electric field and a grounded object can be illustrated by consideration of a capacitive sensing system used on a conventional automatic garage door.

Generally, a sensing element would be mounted along the bottom edge of a garage door such that the sensing element extends along the entire width of the door before terminating just short of the door guide rails. In this manner, the extreme ends of the sensing element are adjacent the opposing guide rails on which the door moves during opening and closing. As such, portions of the sensing element's radiated field, particularly the portions near the grounded guide rails, will be absorbed therein causing the sensing field to be smaller at the ends of the sensing element. Hence, the grounded object effectively operates on the radiated field to effect its radiated shape or pattern.

The present invention provides a method of controlling the shape or pattern of a radiated electric field to enhance the overall utility of a capacitive sensing system.

SUMMARY OF THE INVENTION

The present invention provides a capacitive sensing apparatus having utility in object detection in security and safety applications whereby the object detection field generated by the apparatus is made steerable such that the direction and pattern of the object detection field is adjustable as desired.

The apparatus includes a power source having a ground connection in communication with at least one sensing circuit operative to detect an object moving within the sensing field. The sensing circuit includes an oscillator and at least one sensing element.

At least one conductive element is provided in communication with electrical ground. The conductive element is operative to attract and direct a portion of the sensing field to the electrical ground as a function of the distance between the conductive element and the at least one sensing circuit. To steer the direction of the sensing field, the relative position and distance between the conductive element and the sensing element is adjusted such that a desired sensing field pattern and direction is obtained.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

The present invention provides a capacitive sensing system wherein the radiated field from the sensing element used therein may be shaped and directed such that the sensing field provides optimal coverage in security applications.

Figure 1:
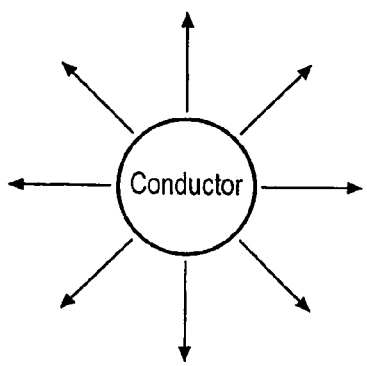
FIG. 1 illustrates a cross-sectional view of a sensing element having radiated sensing field lines emanating therefrom as when attached to a varying power source.

The present invention relies upon the principles of capacitive coupling between two isolated conductors wherein a first conductor conducts a varying electric signal to produce electric field lines as shown in FIG. 1 and a second conductor being grounded is placed in close proximity to the first conductor to accomplish sensing field shaping and/or steering.

Figure 2A:
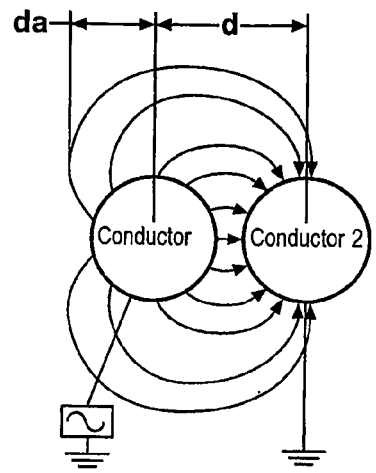
FIG. 2A illustrates a cross-sectional view of the behavior of the sensing field lines of FIG. 1 when a grounded conductor is placed in close proximity to the sensing element.
Figure 2B:
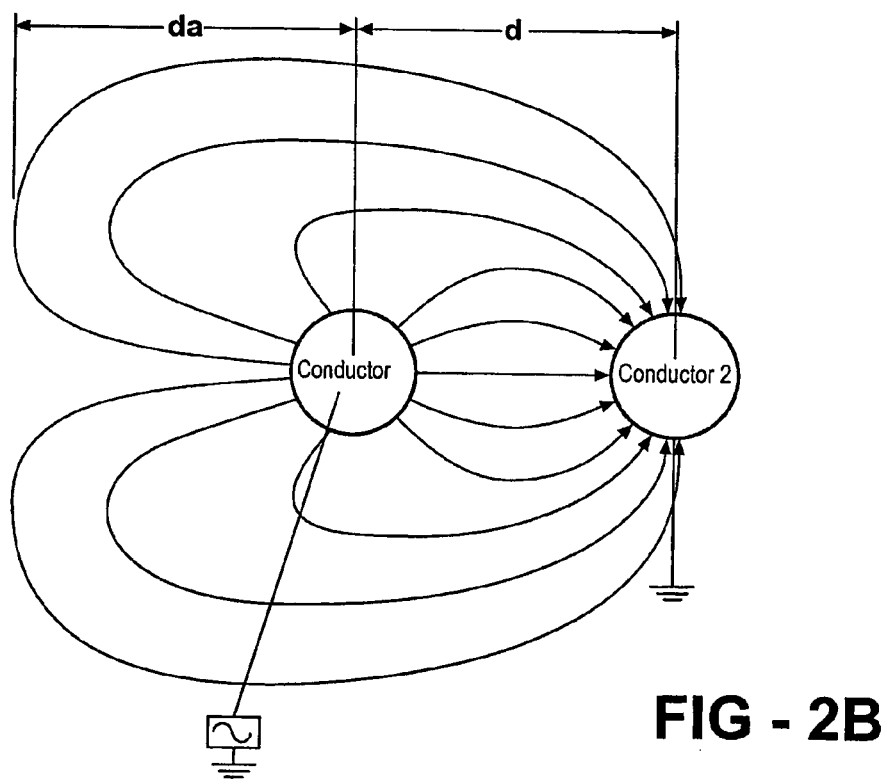
FIG. 2B illustrates a cross-sectional view of the behavior of the sensing field lines of FIG. 2A when the grounded conductor is moved further away from the sensing element.

As best illustrated in FIG. 2A, AC voltages being input into conductor 1 are capacitively coupled to the adjacent conductor 2, which is attached to ground. The amount of electric field or capacitive coupling that occurs as a result of arranging two conductors as in FIG. 2A is dependent on the distance D between the two conductors and the voltage and frequency of the power source V1. When V1 remains constant, capacitive coupling depends primarily on the orientation and separation of the wires 1 and 2. As the distance D between the conductors 1 and 2 decreases, the capacitive coupling increases, thereby decreasing the sensing field, and vice versa. Similarly, arranging conductors 1 and 2 in a parallel fashion allows for maximum capacitive coupling whereas minimum coupling is accomplished by arranging conductors 1 and 2 perpendicular to one another. FIG. 2B shows the effect of moving the two conductors further away from each other. Specifically, there is less coupling between the two conductors thereby allowing for a larger sensing field (ds) on the side of the sensing element further away from the grounded object.

Using the principles of conductor separation and conductor orientation as they relate to capacitive coupling described above, it is an object of the present invention to develop an apparatus and method for shaping the field patterns or controlling the direction of the radiated field lines for use in security, safety or other object detection applications. Essentially, the apparatus includes a power source having a ground connection. The power source is placed in communication with at least one sensing circuit comprising an oscillator and a sensing element. The sensing circuit is operative to detect an object moving within the sensing field and thereafter trigger an alarm circuit. The sensing circuit includes an oscillator and at least one sensing element which both cooperate with the power source to produce the sensing field.

At least one conductive element is provided in communication with electrical ground and placed in close proximity to the sensing element of the sensing circuit. The conductive element is operative to attract and direct a portion of the sensing field to the electrical ground as a function of the distance between the conductive element and the at least one sensing circuit. To steer the direction of the sensing field, the position and distance between the conductive element and the sensing element is adjusted such that a desired sensing field pattern and direction is obtained.

One illustrative application wherein the steerable capacitive sensing field apparatus and method has utility is shown in FIGS. 7A–7D which depicts top, side and enlarged views of a sliding security gate. This application involves applying a capacitive sensing element on the leading edge 40 and trailing edge 38 of a sliding gate 31. The leading edge 40 of the gate 31 has a sensing element 35 embedded in a non-conductive rubber extrusion 39 that is approximately 4" deep mounted on a spacer 37. The sensing element is connected to the field generator 34. The trailing edge 38 also has sensing element 33 embedded in a smaller rubber extrusion 36, e.g. 1" deep extrusion on spacer. This sensing element 33 is attached to its own field generator 32.

The sliding gate 31 is grounded and will provide coupling to the sensing elements, or antennas, thereby affecting the sensing field. It is desirable to have a greater sensing field 43 on the leading edge 40 of the gate 31 where there are no other obstructions other than a pedestrian or a vehicle. In this case, the sensing element 35 could sense objects further away. The trailing edge field 42 is made smaller than the leading edge field 43 because the sensing element 33 will be passing fence posts on the stationary fence 30 as it opens which could cause false alarms in the sensing system. In this case, the field may only sense objects less than 1" away from the sensing element 33.

Figure 6:
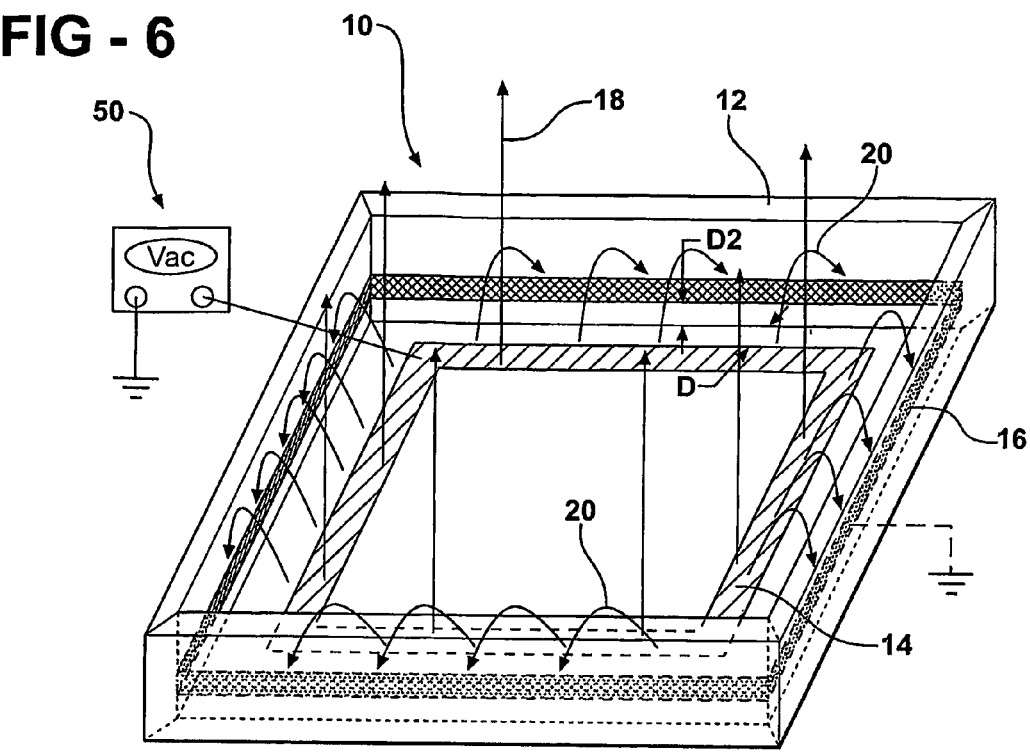
FIG. 6 illustrates the capacitive sensing apparatus with steerable sensing fields implemented on an artifact display case.
Figure 7A:
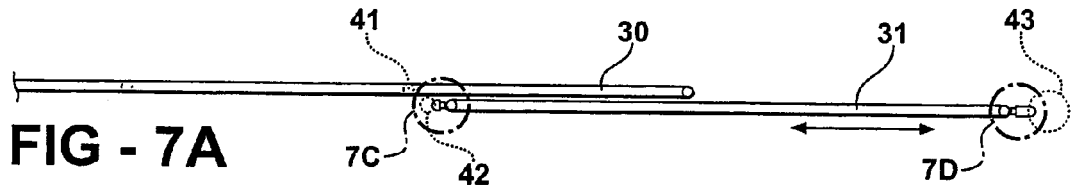
FIGS. 7A–7B illustrate side and top views of the capacitive sensing apparatus with steerable sensing fields implemented on a sliding gate.
Figure 7C:
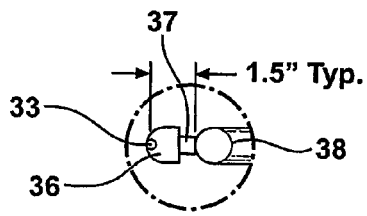
FIGS. 7C–7D illustrate enlarged top views of opposing ends of the sliding gate of FIG. 7A.
Figure 7D:
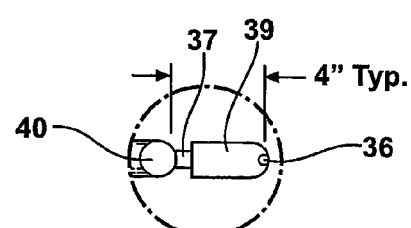
Figure 7B:
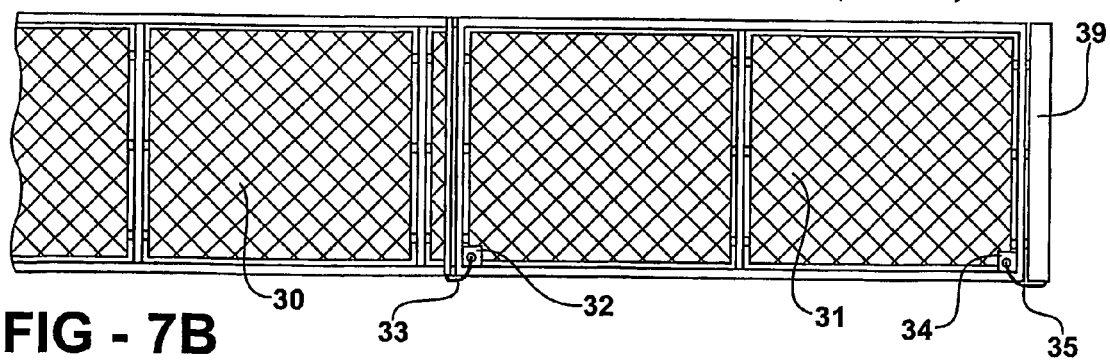

FIG. 6 illustrates a second application for the steerable capacitive field apparatus and method. Here, the sensing field steering apparatus and method is exemplified as shaping the sensing field about a display case used for displaying artifacts. The display case 12 is formed of a nonconductive material such as glass, fiberglass or similar nonconductive material used for forming display cases and may be in any shape without exceeding the scope of the invention.

A sensing element or antenna 14 is attached to the bottom surface of the display case 12 such that a small distance D is formed between the inner edge of the bottom surface and the outer edge of the sensing element 14. Preferably, the sensing element 14 is made from a conductive tape material such that it can be easily adhered to the bottom surface of the display 12. Illustratively, the sensing element may also be provided as a rectangular metal plate or wire screen.

An AC voltage of a predetermined magnitude and frequency is applied to the sensing element 14 to create a radiated electric field that emanates therefrom.

A second conductor 16 is positioned to surround the base of the display 12 on the inner sidewalls of the case at a distance D2 up from the bottom surface of the case. The conductor 16 is electrically grounded relative to the sensing element 14.

If someone attempts to reach into the display case from the top then the field lines 18 running normal to the surface of the display will be disturbed and an alarm will be activated. This layout prevents false alarms from occurring due to someone standing right next to the display. Although FIG. 6 illustrates the apparatus for use with a display case for displaying artifacts, the invention may also be used in home security applications, protection of wall hangings such as paintings, or the like.

Figure 3:
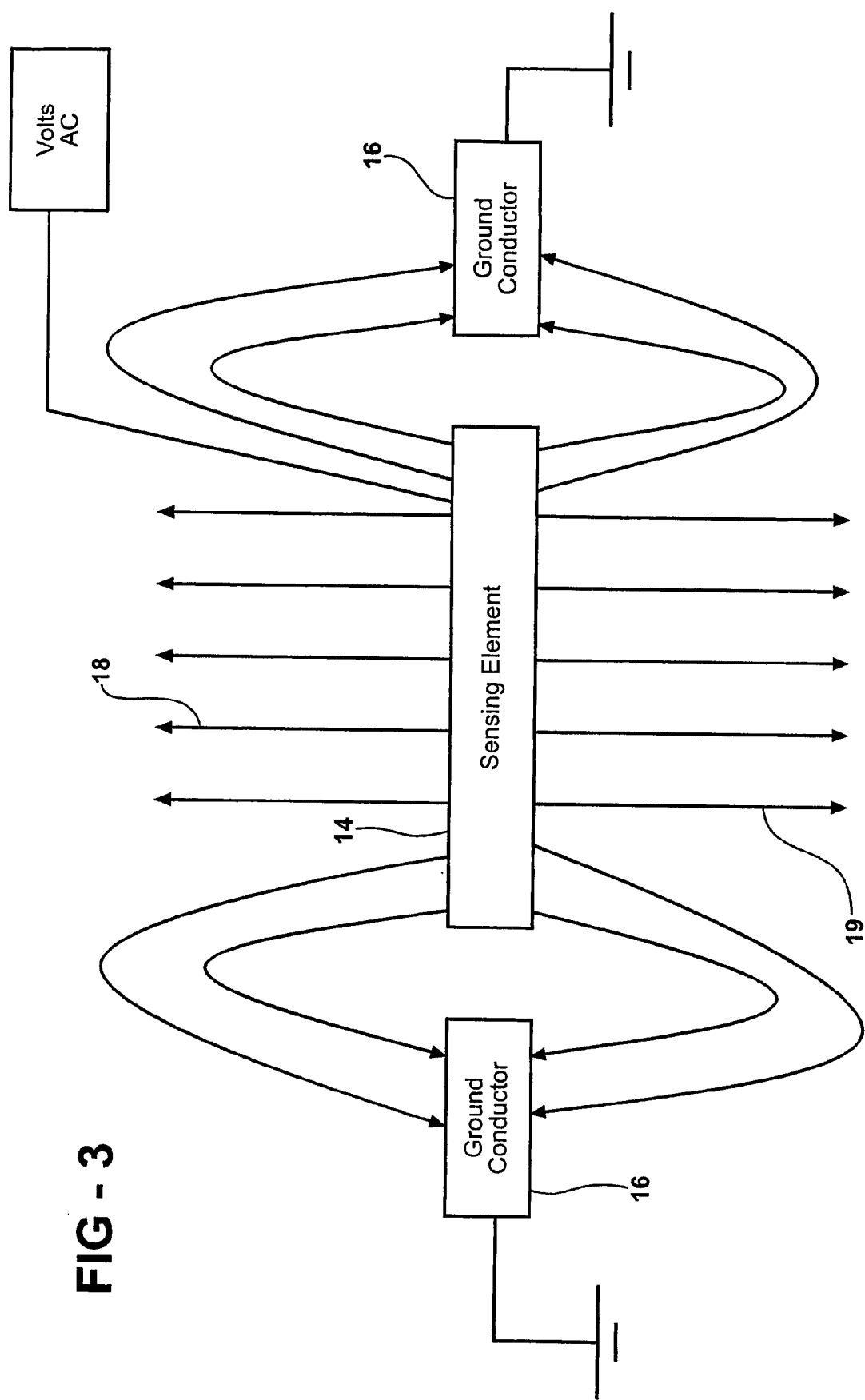
FIG. 3 illustrates two grounded conductors being used to steer sensing field lines such that the sensing field pattern and direction is affected.

FIG. 3 best illustrates an alternative configuration of a sensing element 14 and ground conductor 16 which can be used to shape the sensing field pattern in a display case. In this case, two ground conductors 16 are placed adjacent to a single sensing element 14 in a coplanar and parallel fashion such that one conductor 16 is placed on either side of the sensing element 14. The sensing field lines extending from the sensing element 14 move in a first direction 18 such that a sensing field is created normal to the surface of the display 12 while field lines 19 extend in a direction 180 degrees out of phase with field lines 18. In this fashion, the sensing field would extend above and below the top surface of the display 12 whereby a conductive object entering the field will cause the sensing circuit to trigger an alarm. If the display case is approached from the side by a conductive body it will not be sensed because the sense lines 20 have been pulled towards the ground conductors 16. It is appreciated that the size of the sensing element 14 and the ground conductors 16 must be carefully selected to ensure a proper sensing field is obtained.

As shown in FIG. 3, the sensing element 14 preferably has a larger cross-sectional area than the ground conductor 16 to ensure that all the field lines 18 are not absorbed to ground 16. As an example, a 4:1 ratio, sensing element to ground conductor, and proper spacing should result in a substantially vertical sensing field.

Various types of conductors may be used to achieve the desired results as according to the invention. However, the conductive material used should be of a flexible or resilient nature such that it can be formed into various shapes for application to various surfaces without breakage.

The present invention provides a capacitive sensing system wherein the sensing element's sensing field can be shaped such that the sensing field is uniform along the length of the sensing element, particularly when the opposite ends of the sensing element are adjacent grounded objects.

Figure 4A:
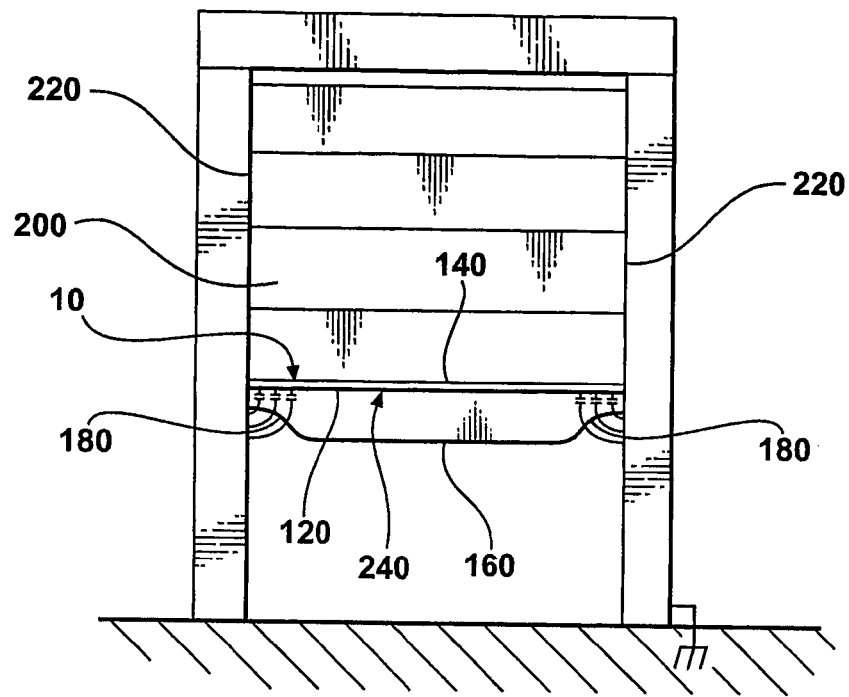
FIG. 4A illustrates a substantially uneven sensing field emanating from an edge of an overhead door prior to implementing the present invention.
Figure 4B:
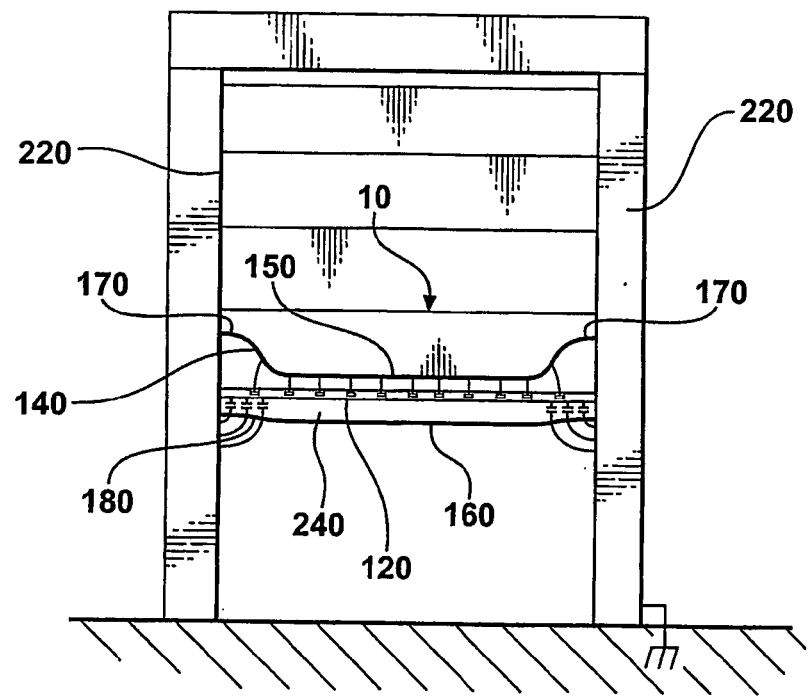
FIG. 4B illustrates a substantially uniform sensing field emanating from the edge of the overhead door after implementing the present invention.

Referring now to FIGS. 4A and 4B, the steerable capacitive sensing apparatus 100 is being utilized with a nonmetallic overhead door 200 having metal guide rails 220 along its sides for which the door moves during opening and closing, such as a garage door. However, it is appreciated that the apparatus 100 may have utility in other cases where sensing fields may be affected by grounded objects adjacent or within the sensing element's sensing field.

The sensing element 120 is mounted along the bottom edge of a nonmetallic door 200 having metal guide rails 220 which are grounded. In this case, the sensing element 120 extends across the bottom edge 240 of the door 200. As such, the sensing element 120 produces an electromagnetic sensing field 160 wherein portions of the field 180 are reduced due to the capacitive coupling or absorption of the field 160 into the grounded guide rails 220 of the door 200. (See FIG. 4A)

As best illustrated in FIG. 4B, the sensing system 100 includes a ground wire 140 that is mounted adjacent the bottom edge 240 of the door 200 such that the ends 170 of the ground wire 140 are spaced further away from the ends of the sensing element 120 where the metal guide rails 220 are absorbing a portion of the field 180. Contrarily, a substantial portion of the ground wire 140 is mounted in close parallel relation to an equivalent portion of the sensing element 120 that is not being affected by the grounded guide rails 220.

The portion 150 of the ground wire 140 being in close proximity to a portion of the sensing element 120 causes the sensing field 160 to be reduced along that portion of the sensing element 120. Placing the ends 170 of the ground wire 140 further away from the sensing element 12 causes the ends 170 of the ground wire 140 to have little effect on the portions 180 of the sensing field 160. Accordingly, the shape of the sensing field 160 is made substantially uniform relative to the bottom edge 240 of the door 206 through adjusting the position of portions of the ground wire 140 relative to the sensing element 120.

Preferably, the spacing of the ground wire 140 relative to the sensing element 120 is 4 to 8 inches at its ends 170 and 1 to 2 inches along the portion 150 away from the ends 170. As illustrated in FIG. 4B, the capacitive coupling between the ground wire 140 and the sensing element 120 is much greater along the portion of the ground wire 150 than at the ends 170. This capacitive coupling causes the sensing field 160 of the sensing element 120 to be reduced in that region. Although the overall field 160 will be reduced when the ground wire 140 is placed in close proximity to the sensing element 120, the reduction in field 160 can be compensated for by increasing the field strength of the signal being delivered to the sensing element 120, thus causing the sensing field 160 to increase, or by increasing the sensitivity of the detection device.

Moving the ground wire closer or further away from the sensing element effectively causes variations in the sensitivity of the field along the length of the sensing element. Thus, the absorption effects of the grounded objects in close proximity to the sensing element 120 can be offset by properly placing a ground wire 140 a relative distance from the sensing element 120 to adjust the shape of the sensing element's sensing field 160.

It is important that once the distance between the sensing element and ground wire is determined that this distance not vary during the operation of the door because this could cause false triggering. The sensing element 120 and ground wire 140 must be firmly attached to a door 200 such that movement is substantially prevented is not allowed.

Figure 5A:
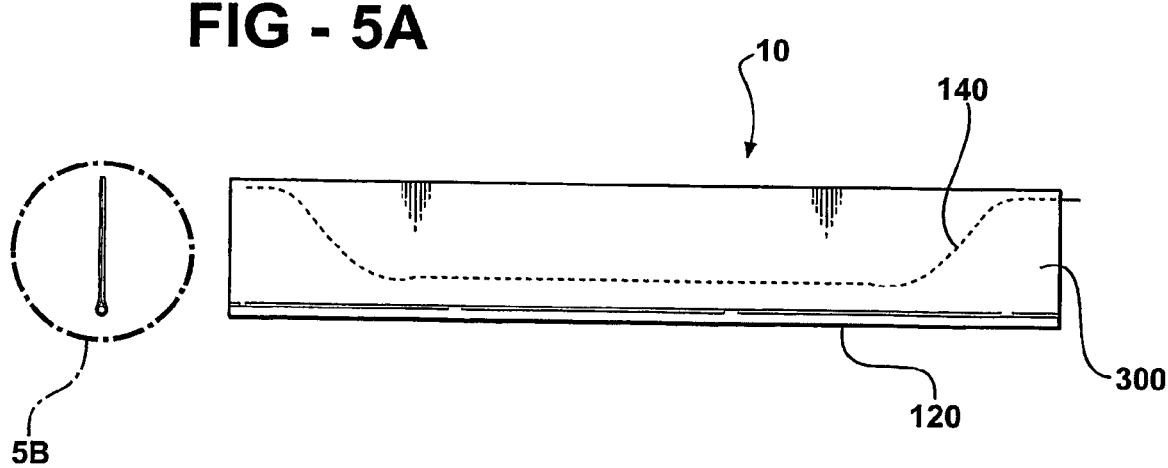
FIGS. 5A–5C illustrate methods of arranging the sensing element and grounded conductor on the overhead door as according to the invention.
Figure 5B:
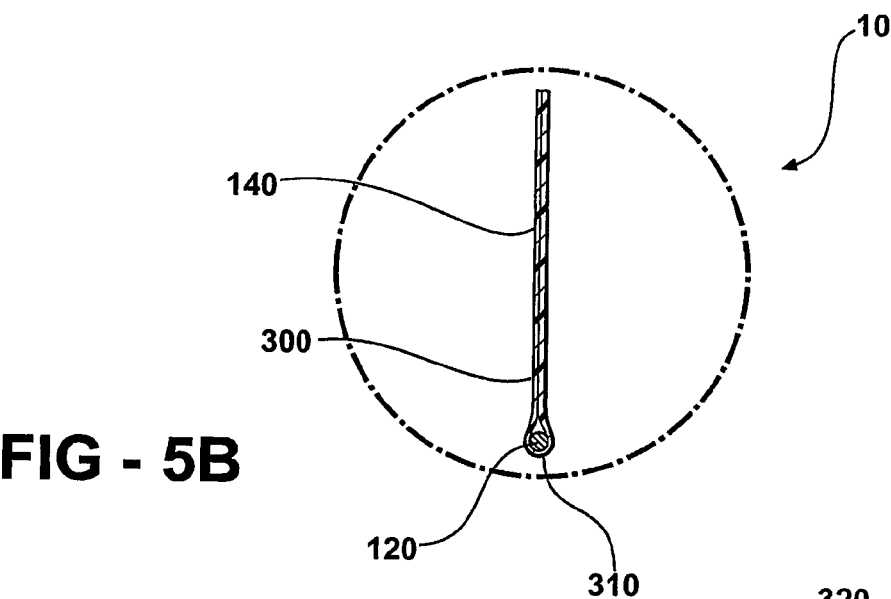

Referring to FIGS. 5A and 5B, a housing 300 is provided that maintains the sensing element 120 and ground wire 140 at their predetermined spaced relationship of 0.5" to 5", preferably 1" to 4". In this case, the housing 300 is formed of a resilient material having an inside surface coated with an adhesive. The ground wire 140 and sensing element 120 are placed on the adhesive surface with the appropriate spacing to effect the desired wave shape and the material is folded such that the inside surfaces adhere to each other sandwiching the wires in place to form the housing 300. As best illustrated in FIG. 5B, the sensing element 120 is positioned at the fold 310 of the housing with the ground wire 140 sandwiched within the housing at its predetermined distance from the sensing element 120.

Figure 5C:
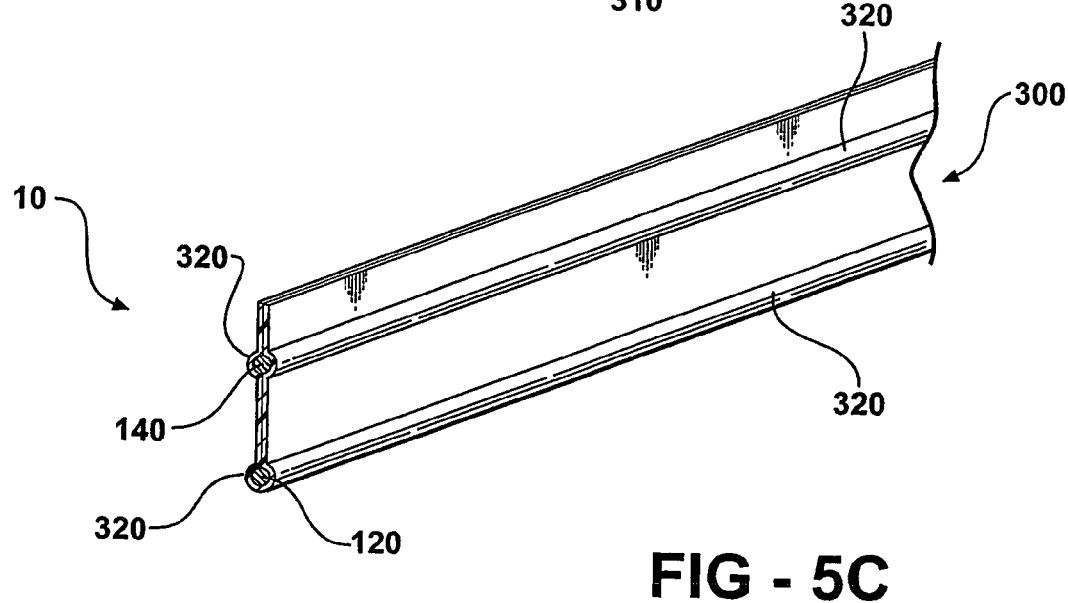

FIG. 5C illustrates an alternative housing 300' that includes extrusions 320 in which each of the sensing element 120 and ground wire 140 are encased at their predetermined and spaced apart distance. The housing may be made from a hard plastic material, rubber or other material suitable for such purpose. The housing 300' may be attached to the edge of the door 200 with an appropriate fastening means.

A still further embodiment for mounting the system 100 to the structure 200 may simply employ the use of an adhesive tape to secure the ground wire 140 at the predetermined distance to affect the sensing field of the sensing element 120 and mounting the sensing element 120 along the edge of the structure 200 in a similar manner (not shown). There are circumstances when the distance from the electrical supply ground to the ground where the capacitive sensing element is located is very large. Under such circumstances, there is a greater chance of electrical ground noise being introduced into the system, especially if the sensing element is large.

Figure 8:
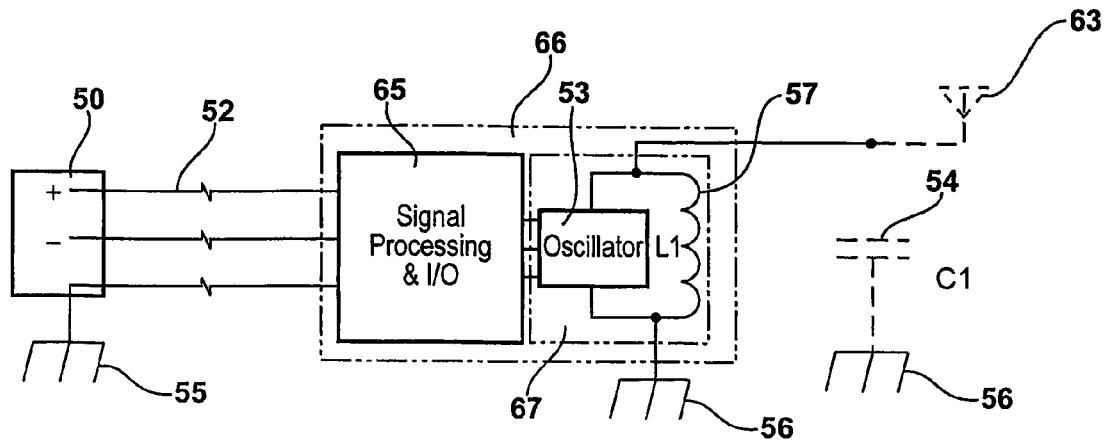
FIG. 8 illustrates a diagrammatic view of the capacitive sensing apparatus having separate power source and sensing element grounds for minimizing ground offsets.

FIG. 8 shows a typical diagrammatic view of the capacitive sensing system 10 as according to the invention. The system 10 is grounded at the power source 50 by connecting to the electrical ground 55. The sensing circuit 66 includes an oscillator circuit 67 and a signal processor 65. Preferably, the oscillator circuit 67 is made up of the oscillator 53 and an LC tank circuit consisting of an inductor 57 and a virtual capacitor 54. The sensing circuit 66 is connected to the power source and ground through an electrical cable 52. When the power source 50 and sensing circuit 66 are in close proximity, the sensing circuit 66 may not typically have a ground connection 56 at the oscillator. However, noise can be introduced into the oscillator circuit 67 if there is a long distance between the power source ground 55 and the physical location of the sensing element 63. In such cases there may be ground potential differences between the two locations that introduce this noise. This is especially true when the sensing element 63 is relatively large.

One way of decreasing such noise is shown in FIG. 8. The oscillator 53 and inductor coil 57 are connected to a local ground 56 located near the sensing element 63. The difference in ground potentials between the capacitive coupling 54 to ground 56 and the oscillator ground is minimal, thus keeping the ground noise at a minimal.

Figure 9:
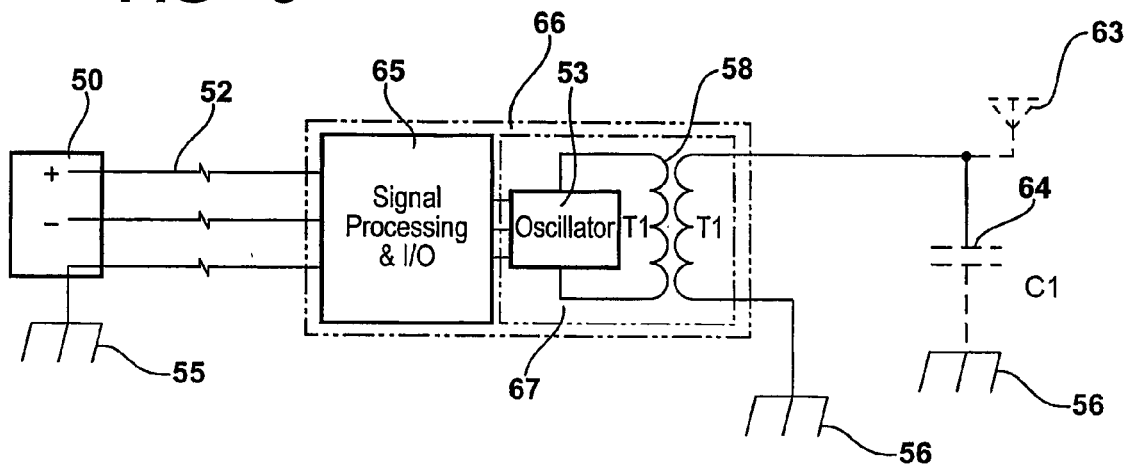
FIG. 9 illustrates a diagrammatic view of the capacitive sensing apparatus having one-half of an isolation transformer attached to the sensing element while grounded to prevent ground loop noise.

Sometimes ground loop noise is introduced when the circuit is connected to a remote ground 55 and the local ground 56. FIG. 9 shows a method of eliminating the ground loop. In this case an isolation transformer T1 58 is used in place of a single inductor L1. The oscillator circuit 67 is now made up of the oscillator 53 and tank circuit consisting of isolation transformer 58 and virtual capacitor 64. The sensing element side of the transformer 58 is totally isolated from the power supply ground. The sensing element side of the transformer coil 58 has one lead connected to the sensing element 63 and the other is connected to the local ground 56. This eliminates the potential for ground loop noise and keeps the reference ground of the tank circuit the same as the sensing element ground.

Figure 10:
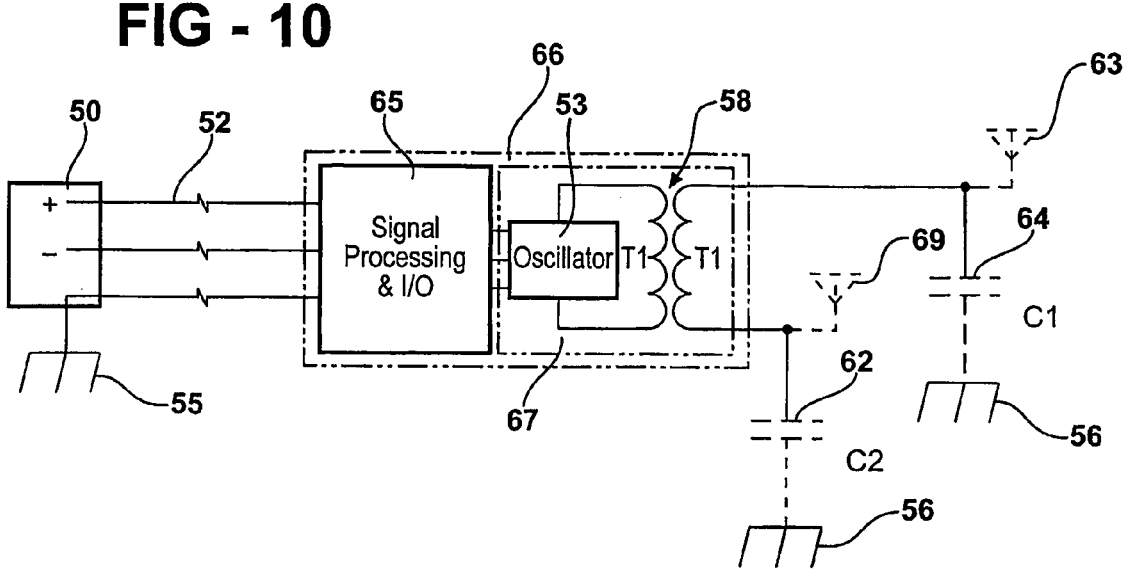
FIG. 10 illustrates a diagrammatic view of the capacitive sensing apparatus having power source ground and dual sensing elements to prevent ground loop noise.

It is not always easy to make a physical ground connection near where the sensing element is located. Another method of eliminating the ground loops is shown in FIG. 10. One lead of the sensing element side of the isolation transformer coil 58 is connected to one sensing element 63 and the other lead is connected to another sensing element 69. Each of these sensing elements will be electrically isolated from each other except through the transformer coil 58. They will each have some coupling to ground, thus acting as a ground reference for each other.

As a conductive object approaches one of the sensing elements 63 it will couple part of the signal through the object to ground 56. The other sensing element 69 will provide for coupling to the local ground 56 thereby completing the circuit. If a conductive object is brought near both sensing elements 63 and 69 at the same time then it will provide additional capacitive coupling between the two sensing elements which will also affect the frequency of the oscillator circuit 67. The two sensing elements will exhibit equal sensitivity if they are of equal size and distance from the ground plane 56. If one of the sensing elements is much larger than the other and equidistant from the ground plane then the larger of the two antennas will act more of a ground reference for the smaller antenna. A conductive object near the larger sensing element will affect the frequency of the oscillator circuit less than a conductive object moving near the smaller antenna.

Figure 11:
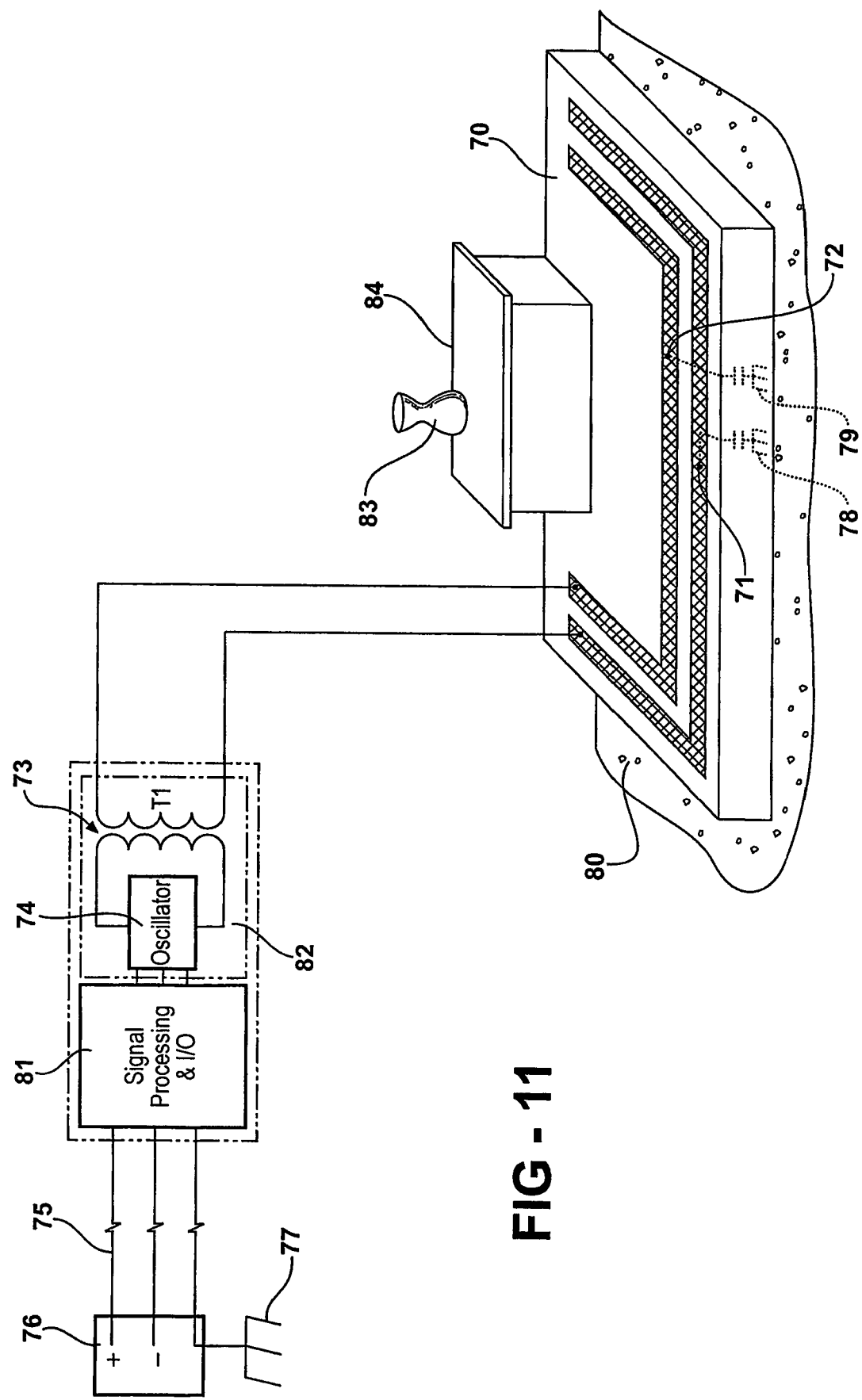
FIG. 11 illustrates a perspective view of the capacitive sensing apparatus having dual sensing elements implemented to prevent ground loops in a security application.

A practical example of how the dual sensing element system would be implemented in a security application is shown in FIG. 11. In this case an object 84 to be protected such as an antique is placed on a raised platform 70. A sensing circuit 82 consisting of a signal processor 81, oscillator 74, and isolation transformer 73 is connected to two sensing elements 71 and 72. These sensing elements may be formed of a metal screen material and would be fastened just under the top surface of the platform 70.

It is assumed that the power source ground 77 is located a long distance from the ground plane 80 near the platform 70. Each sensing element will have some capacitive coupling 78 and 79 to the local ground 80 under the platform. If a person or conductive, object attempts to approach the protected object 83 then he will add an additional capacitive load to ground as he nears one of the sensing elements 71 and 73 or he will provide additional coupling between the two sensing elements if he steps on both of them at the same time. In either case this will cause a decrease in the frequency of the oscillator 74 which will then be processed by the signal processor circuitry 81 to determine the amount of frequency shift.

In some cases, a battery may be provided as a power source for supporting a standalone capacitive sensing system disposed on an artifact display case wherein a direct connection to ground is unavailable. Under such circumstances, a metal plate or screen may be disposed between a bottom surface of the display case and the floor whereby the plate or screen is adapted to operate as a virtual ground for the sensing element. The sensing element 14 is electrically connected to the metal plate disposed beneath the display case. The metal plate is operative to capacitively couple to the local earth ground or grounded structure beneath the floor such that a virtual ground is provided for the standalone system. As a conductive object moves within the sensing field of the standalone system, the additional capacitive coupling to ground affects the field generating frequency such that an alarm mechanism is triggered.

From the foregoing it is appreciated that one skilled in the art upon reading the specification will appreciate changes and modifications that do not depart from the spirit of the invention. These changes and modifications and equivalents thereof are intended to be encompassed within the scope of the appended claims.

I claim:

1. A capacitive sensing apparatus having a steerable sensing field comprising:
   a power source having a first ground connection;
   at least one sensing circuit in communication with said power source, said sensing circuit having a signal processing circuit and an oscillator circuit wherein said oscillator circuit includes an oscillator and at least one sensing element; and
   at least one conductive element in communication with a second ground connection, said at least one conductive element disposed adjacent said sensing element and operative to attract a portion of the sensing field of the at least one sensing element such that the sensing field is made steerable by changing position of either a portion of the at least one sensing element or a portion of the at least one conductive element relative to one another.

2. The capacitive sensing apparatus of claim 1 wherein the at least one sensing circuit is at least one meter from said power source.

3. The capacitive sensing apparatus of claim 2 wherein the at least one sensing element is a portion of an inductor and wherein the at least one sensing circuit includes a local ground connection at the inductor.

4. The capacitive sensing apparatus of claim 3 wherein the local ground is provided by a metal plate capacitively coupled to earth ground.

5. The capacitive sensing apparatus of claim 1 wherein the at least one sensing circuit includes an isolation transformer disposed between said power source and said at least one sensing element whereby said at least one sensing element is isolated from the power source ground.

6. The capacitive sensing apparatus of claim 5 wherein the isolation transformer includes first and second coils having opposing ends, said first coil being connected to said oscillator at both ends and said second coil being connected to said at least one sensing element at one end and to a local ground at the other end.

7. The capacitive sensing apparatus of claim 5 wherein the isolation transformer includes first and second coils having opposing ends, said first coil being connected to said oscillator at both ends and said second coil being connected to a first sensing element at one end and connected to a second sensing element at the other end.

8. The capacitive sensing apparatus of claim 7 wherein said first sensing element is larger than said second sensing element.

9. The capacitive sensing apparatus of claim 1 wherein the sensing element is formed of a metallic tape.

10. The capacitive sensing apparatus of claim 1 wherein the sensing element is formed of a metallic screen material.

11. The capacitive sensing apparatus of claim 1 wherein the sensing element is formed of a metal plate.

12. The capacitive sensing apparatus of claim 1 further comprising a housing having said sensing element and said conductive element disposed therein, said housing operative to fixedly support said sensing element and said conductive element at a predetermined distance relative to one another.

13. The capacitive sensing apparatus of claim 1 wherein said sensing element and said conductive element are disposed on an overhead garage door.

14. The capacitive sensing apparatus of claim 1 wherein said sensing element and said conductive element are disposed on a sliding security gate.

15. The capacitive sensing apparatus of claim 1 wherein said sensing element and said conductive element are disposed on an artifact display case.

16. A method of steering sensing fields of an object detection apparatus comprising the steps of:

providing a power source having a first ground connection;

providing at least one sensing circuit in communication with said power source, said sensing circuit having a signal processing circuit and an oscillator circuit wherein said oscillator circuit includes an oscillator and at least one sensing element; and providing at least one conductive element in communication with a second ground connection, said at least one conductive element disposed adjacent said sensing element and operative to attract a portion of the sensing field of the at least one sensing element such that a portion of the sensing field is made steerable by changing position of either a portion of the at least one sensing element or a portion of the at least one conductive element relative to one another.

17. The method of claim 16 further comprising the step of providing a housing that supports said at least one sensing element and said at least one conductive element therein at a predetermined distance.

* * * * *

UNITED STATES PATENT AND TRADEMARK OFFICE
CERTIFICATE OF CORRECTION

| | | |
|---|---|---|
| PATENT NO. | : 7,167,093 B2 | Page 1 of 1 |
| APPLICATION NO. | : 10/538533 | |
| DATED | : January 23, 2007 | |
| INVENTOR(S) | : Robert T. Fergusson | |

It is certified that error appears in the above-identified patent and that said Letters Patent is hereby corrected as shown below:

Column 5, line 42, replace "206" with --200--

Signed and Sealed this

Seventeenth Day of April, 2007

JON W. DUDAS
*Director of the United States Patent and Trademark Office*